A. A. NELSON.
INDICATOR OR DETECTOR FOR LUBRICATING SYSTEMS.
APPLICATION FILED JULY 9, 1913.

1,114,636.

Patented Oct. 20, 1914.

Witnesses
Eric G. Flannagan
John J. McCauley

Inventor
A. A. Nelson.

By Victor J. Evans
Attorney

UNITED STATES PATENT OFFICE.

ARTHUR A. NELSON, OF IOWA CITY, IOWA.

INDICATOR OR DETECTOR FOR LUBRICATING SYSTEMS.

1,114,636.  Specification of Letters Patent.  Patented Oct. 20, 1914.

Application filed July 9, 1913. Serial No. 778,140.

*To all whom it may concern:*

Be it known that I, ARTHUR A. NELSON, a citizen of the United States, residing at Iowa City, in the county of Johnson and State of Iowa, have invented new and useful Improvements in Indicators or Detectors for Lubricating Systems, of which the following is a specification.

This invention relates to improvements in indicators or detectors for lubricating systems and has particular application to a device of the class described for use in conjunction with the oil reservoirs of internal combustion engines.

In carrying out the present invention, it is my purpose to provide an indicator or detector whereby when the oil within the oil reservoir or tank has fallen below a predetermined level, the magneto or other source of current for the ignition system of the engine will be short circuited so as to bring the engine to a standstill and thereby prevent burning out of the bearings dependent upon the lubricating system.

It is also my purpose to provide a detector or indicator of the float controlled type which will embrace the desired features of simplicity, efficiency and durability and which may be readily installed and wherein the component parts will be so arranged and correlated as to reduce the possibility of derangement to a minimum.

With the above and other objects in view, the invention consists in the construction, combination and arrangement of parts hereinafter set forth in and falling within the scope of the claims.

Figure 1:
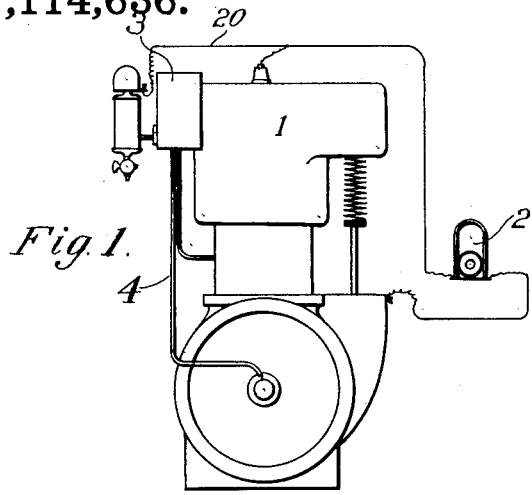
Figure 3:
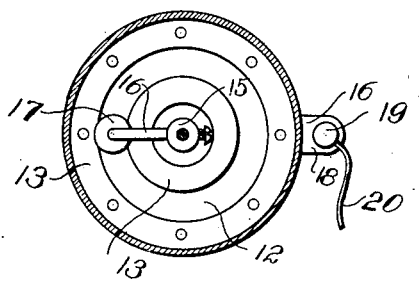
Figure 2:
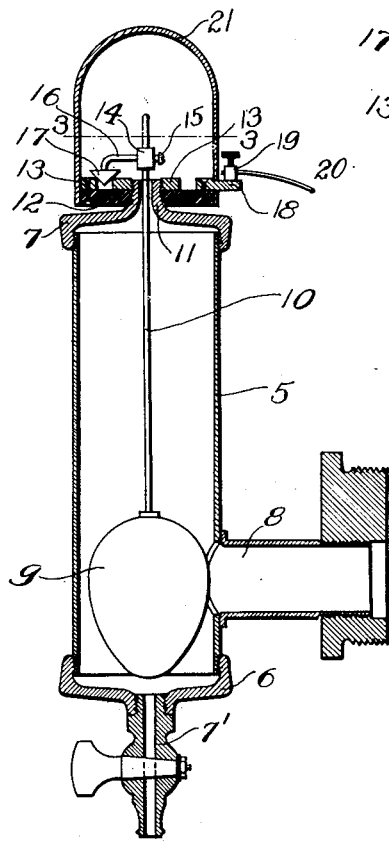

In the accompanying drawing: Figure 1 is a diagrammatic view showing my improved indicator or detector installed. Fig. 2 is a vertical sectional view through the detector, and Fig. 3 is a cross sectional view on the line 3—3 of Fig. 2.

Referring now to the accompanying drawing in detail, the numeral 1 designates an appropriate form of internal combustion engine, while 2 indicates a source of current for the ignition system of such engine, such source being shown in the present instance as a magneto. 3 designates the oil reservoir or tank for the engine, such reservoir being connected with the crank case, cylinders and other parts of the engine to be lubricated by means of conduits or pipes 4 as is well understood by those skilled in the art.

In accordance with my present invention, I employ a detector or indicator which is in open communication with the oil tank or reservoir and preferably of the float controlled type and which acts, when the oil within the reservoir has fallen below a predetermined level, to short circuit the magneto and so deënergize the spark plugs of the engine whereby the latter is brought to an immediate stop thereby notifying the operator of the condition of the oiling system. This detector or indicator comprises a cylindrical shell 5 having the lower end thereof closed through the medium of a cap 6 threadedly engaging the same and the upper end closed through the medium of a cap 7 threaded thereon, the cap 6 carrying a pet cock 7' by means of which the shell 5 may be drained. Opening into the shell 5 adjacent to the lower end thereof is a tube 8 threadedly engaging an aperture formed in the oil reservoir or tank 3 immediately adjacent to the bottom wall thereof and slidably mounted within the shell 5 is a float 9 carrying an upwardly projecting vertical stem 10 extending through a nipple 11 formed on the cap 7 approximately centrally thereof and threaded exteriorly to receive a fiber disk 12. Suitably connected to the upper surface of the fiber disk 12 and spaced apart are concentrically disposed metallic rings 13, 13 and slidably mounted upon the upper end of the stem 10 is a collar 14 equipped with a set screw 15 whereby the collar may be held on the stem in any desired adjusted position. Formed integral with the collar 14 and extending outwardly thereof is a finger 16 having the free end thereof formed with a depending bridging strip 17 adapted when at its limit of downward movement to bridge the rings 13, 13. The outer ring 13 is formed with a radially projecting lug 18 equipped with a binding post 19 to which is connected one terminal of a wire 20, the free terminal of such wire being connected in circuit with the magneto. The inner ring 13 is in contact with the nipple 11 on the cap 7 and as a result is grounded upon the engine through the medium of the shell 5, the reservoir and the conduits connecting the reservoir with the engine, the magneto being also grounded upon the engine as is well known. Secured to the marginal edge of the disk 12 is a cap 21 inclosing the rings 13, 13, the arm 16 and the upper end of the stem 10.

From the foregoing description taken in connection with the accompanying drawing, the construction, mode of operation and manner of employing my invention will be readily apparent. In practice, the oil reservoir is filled with a lubricant and such lubricant enters the shell 5 by way of the tube 8. As the oil enters the shell, the float 9 moves upwardly thereby elevating the stem and disengaging the bridging strip 17 from the rings 13, 13. As the upper end of the stem 10 engages the top of the cap 21 further upward movement of the float is eliminated and the latter held at its limit of upward movement under the action of the oil within the reservoir or tank. Assuming the engine to be operating and the oil within the oil reservoir exhausted, the float 9 will drop and the bridging strip 17 bridge the rings 13, 13 with the effect to ground the magneto on the engine thereby short circuiting the spark plugs or other igniting devices and bringing the engine to a standstill. Thus, the operator of the vehicle in which the engine is installed will be notified as to the condition of the oiling system.

By means of the adjustable connection between the finger 16 and the stem 10, it will be seen that the detector may be adjusted so as to operate when the oil within the reservoir has fallen to any desired level.

While I have herein shown and described one preferred form of my invention by way of illustration, I desire to have it understood that I do not limit or confine myself to the precise details of construction herein described and delineated, as modification and variation may be made within the scope of the claims without departing from the spirit of the invention.

I claim:

1. A detector for oil reservoirs comprising a vertical tube connected adjacent to its lower end with the reservoir, a cap closing the upper end of said tube and formed with an upwardly extending nipple centrally thereof, an insulating disk secured to said nipple, a pair of rings carried by said disk and disposed concentrically of each other, a strip adapted to bridge said rings, a float within said tube and under the control of the oil within the reservoir, and a stem connected to said float and projecting outwardly of the nipple on said cap and connected with said strip whereby the latter will engage said rings when the oil within the reservoir has fallen below a predetermined level.

2. A detector for oil reservoirs comprising a vertical tube connected adjacent to its lower end with the reservoir, a cap closing the upper end of said tube and formed with an upwardly extending nipple centrally thereof, an insulating disk secured to said nipple, a pair of rings carried by said disk and disposed concentrically of each other, a strip adapted to bridge said rings, a float within said tube and under the control of the oil within the reservoir, a stem connected to said float and projecting outwardly of the nipple on said cap and connected with said strip whereby the latter will engage said rings when the oil within the reservoir has fallen below a predetermined level, and means for adjusting the connection between said strip and stem.

3. A detector for oil reservoirs comprising a vertical tube connected adjacent to its lower end with the reservoir, a cap closing the upper end of said tube and formed with an upwardly extending nipple centrally thereof, an insulating disk secured to said nipple, a pair of rings carried by said disk and disposed concentrically of each other, a strip adapted to bridge said rings, a float within said tube and under the control of the oil within the reservoir, a stem connected to said float and projecting outwardly of the nipple on said cap and connected with said strip whereby the latter will engage said rings when the oil within the reservoir has fallen below a predetermined level, means for adjusting the connection between said strip and stem, and a cap secured to the marginal edges of said disk and inclosing said rings and bridging strip.

In testimony whereof I affix my signature in presence of two witnesses.

ARTHUR A. NELSON.

Witnesses:
E. L. MICHAEL,
A. J. BASCHNAGEL.